May 21, 1946.  G. C. MARSH  2,400,651
LIQUID ELEVATING APPARATUS
Filed Aug. 4, 1945   2 Sheets-Sheet 2

Inventor
G. C. Marsh

Patented May 21, 1946

2,400,651

UNITED STATES PATENT OFFICE 2,400,651

LIQUID ELEVATING APPARATUS

Gerald Cranton Marsh, Salford, England, assignor to Gresham & Craven Limited, Salford, England, a company of Great Britain Application August 4, 1945, Serial No. 608,983
In Great Britain August 4, 1944

2 Claims. (Cl. 103—235)

This invention relates to liquid elevating apparatus and has for its object to provide an apparatus which will work with the aid of compressed air to lift liquid and to discharge it to a desired height.

The invention consists in a liquid elevating apparatus comprising a float chamber with a suction and a discharge branch pipe, a float in the float chamber, an ejector, an isolating valve, the ejector exhausting the float chamber through the isolating valve, a duplex valve operated by the float, one portion of the duplex valve controlling the flow of compressed air to the float chamber to effect liquid discharge therefrom, and the other portion of the duplex valve controlling the flow of compressed air to the ejector to produce the suction action and to a diaphragm or piston operating the isolating valve, which is opened only when compressed air is flowing to the ejector.

The invention further comprises the arrangement of a pressure relief valve upon the connection between the ejector and the isolating valve of the float chamber.

Figure 1:
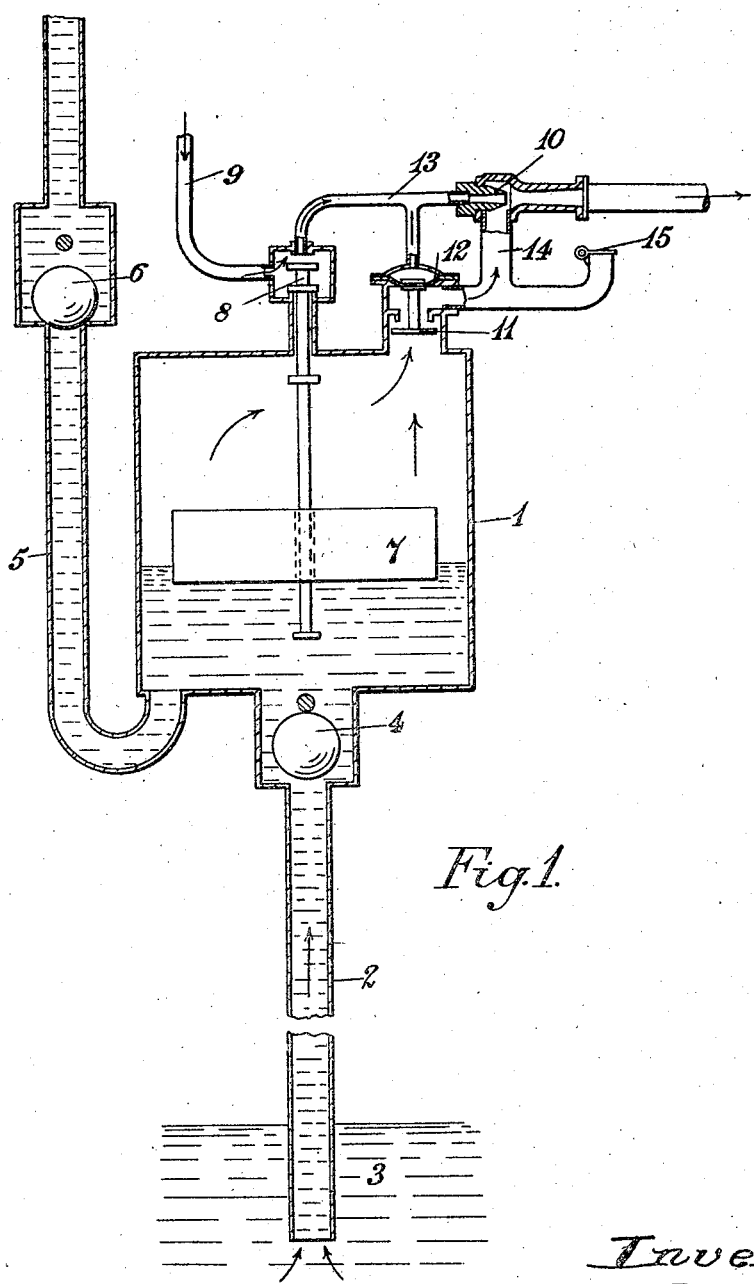
Figure 2:
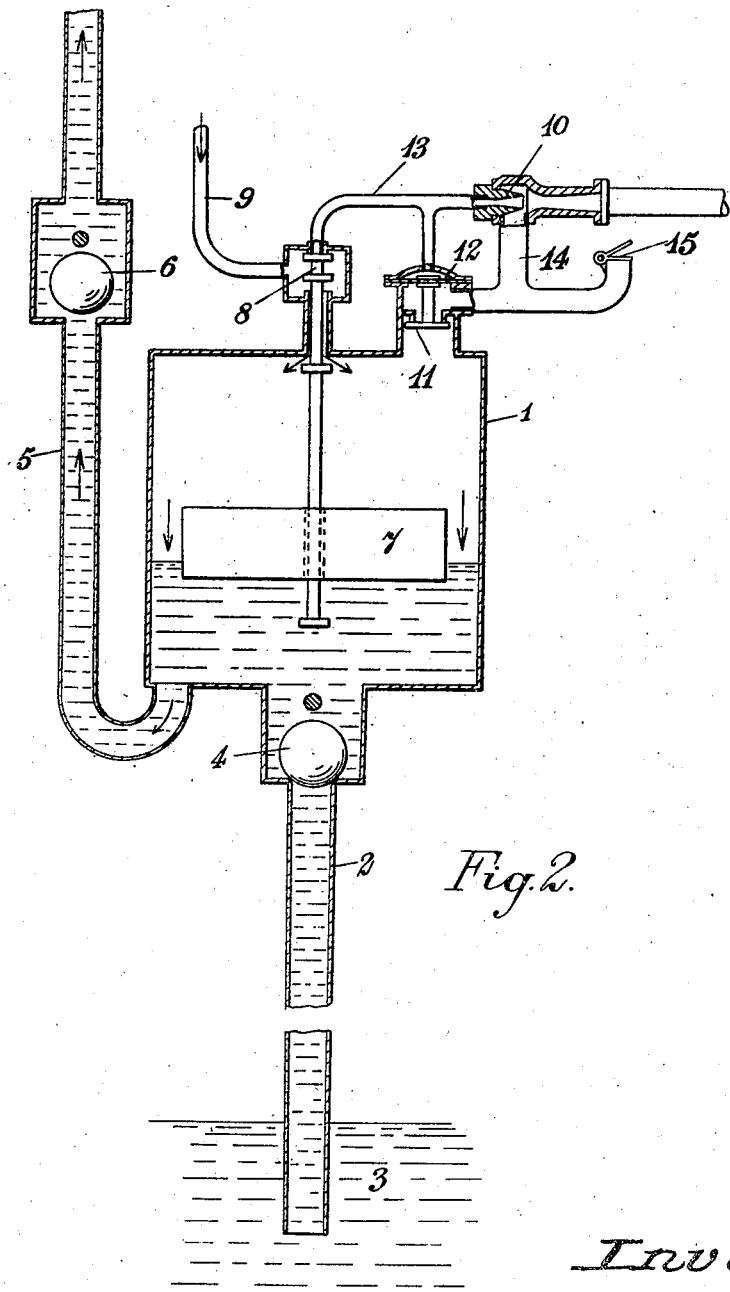

Referring to the accompanying explanatory drawings:

Figures 1 and 2 are sectional views of a liquid elevating apparatus constructed in one convenient form in accordance with this invention, Figure 1 showing the positions of the parts when the float chamber is filling, and Figure 2 the positions of the parts when delivery is taking place up the discharge pipe.

The apparatus comprises a float chamber 1 with a pipe connection 2 dipping into the liquid 3 to be lifted, such pipe having a non-return valve 4 therein, and a discharge pipe 5 (with a non-return valve 6 therein) leading to the point where delivery is desired.

The float 7 in the float chamber 1 operates a duplex valve 8 which controls the admission of compressed air from the branch 9 to the float chamber to effect discharge therefrom and the flow of compressed air to an ejector 10 which serves through a piston or diaphragm operated isolating valve 11 to exhaust the float chamber in order to raise liquid to it up the suction pipe 2.

The piston or diaphragm 12 of the isolating valve 11 is open at one side to the pressure in the compressed air pipe 13 between the valve 8 controlling the flow of compressed air to the ejector 10 and the ejector and at the other side to the suction action of the ejector through the pipe 14. The connection between the isolating valve 11 and the ejector has a pressure relief valve 15 thereon.

With the arrangement described, when the float 7 arrives at its bottom position, it operates the duplex valve 8 to close the valve portion controlling the flow of compressed air to the float chamber 1 and to open the valve portion passing compressed air to the ejector 10 and to the diaphragm or piston 12, thus opening the isolating valve 11. Any residual pressure in the float chamber at the moment the valve 11 opens is released through the pressure relief valve 15. The float chamber 1 is now evacuated and liquid raised to fill the chamber sufficiently to cause the float 7 to reverse the duplex valve 8, closing the valve portion which passes compressed air to the ejector 10 and opening the valve portion which passes compressed air into the float chamber 1. The isolating valve 11 is now closed as there is no pressure on the diaphragm or piston 12 to hold it open. The discharge from the float chamber 1 can be to any height to which the pressure of the compressed air will lift the liquid.

The apparatus is simple in construction and efficient in operation.

What I claim is:

1. A liquid elevating apparatus comprising a float chamber with a suction and a discharge branch, a float in the float chamber, an ejector in connection with the chamber, an isolating valve in the connection between the ejector and the chamber, a member operating the isolating valve, the ejector exhausting the float chamber through the isolating valve, a compressed air supply having branches leading to the chamber and to the ejector and isolating valve, a duplex valve operated by the float and disposed in the compressed air supply between the branches thereof, one portion of the duplex valve controlling the flow of compressed air to the float chamber to effect liquid discharge therefrom, and the other portion of the duplex valve controlling the flow of compressed air to the ejector to produce the suction action and to the member operating the isolating valve, which is opened only when compressed air is flowing to the ejector.

2. In a liquid elevating apparatus as claimed in claim 1, the arrangement of a pressure relief valve upon the connection between the ejector and the isolating valve of the float chamber.

GERALD CRANTON MARSH.